United States Patent
Horiguchi et al.

(10) Patent No.: US 6,216,073 B1
(45) Date of Patent: *Apr. 10, 2001

(54) APPARATUS AND METHOD FOR CONTROLLING A SPEED CHANGE OF AN AUTOMATIC TRANSMISSION

(75) Inventors: Masanobu Horiguchi; Akira Ikeda, both of Atsugi (JP)

(73) Assignee: Unisia Jecs Corporation, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,414

(22) Filed: Apr. 10, 1998

(30) Foreign Application Priority Data

Apr. 25, 1997 (JP) ................................................ 9-109414

(51) Int. Cl.[7] ......................................................... G06F 7/00
(52) U.S. Cl. ............................... 701/51; 701/62; 701/64; 477/109; 477/125; 477/148; 477/904
(58) Field of Search .................................. 701/51, 53, 64, 701/65, 58, 56, 62, 54; 477/62, 54, 168, 84, 181, 94, 905, 120, 125, 902, 901, 904, 102, 107, 109, 115, 144, 73, 74, 75, 80; 74/337

(56) References Cited

U.S. PATENT DOCUMENTS

| | | | |
|---|---|---|---|
| 4,732,055 | * 3/1988 | Tateno et al. | 701/62 |
| 5,121,657 | * 6/1992 | Asada | 477/120 |
| 5,191,814 | * 3/1993 | Ando et al. | 477/125 |
| 5,517,410 | * 5/1996 | Nakagawa et al. | 701/51 |
| 5,531,654 | 7/1996 | Ishikawa et al. | 477/120 |
| 5,655,995 | * 8/1997 | Kondo et al. | 477/155 |
| 5,672,139 | * 9/1997 | Horiguchi | 477/120 |
| 5,765,117 | * 6/1998 | Horiguchi | 701/51 |
| 5,803,865 | * 9/1998 | Harada et al. | 477/119 |
| 5,806,009 | * 9/1998 | Horiguchi | 701/58 |
| 5,832,400 | * 11/1998 | Takahashi et al. | 701/53 |
| 5,890,993 | * 4/1999 | Horiguchi et al. | 477/94 |
| 5,924,957 | * 7/1999 | Yasu et al. | 477/144 |
| 5,974,353 | * 10/1999 | Horiguchi et al. | 701/51 |
| 6,029,107 | * 2/2000 | Sato | 701/58 |

FOREIGN PATENT DOCUMENTS

| | | |
|---|---|---|
| 0 531 154 A2 | 3/1993 | (EP) . |
| 0 532 363 A2 | 3/1993 | (EP) . |
| 7-239021 | 9/1995 | (JP) . |

* cited by examiner

*Primary Examiner*—Jacques H. Louis-Jacques
(74) *Attorney, Agent, or Firm*—McDermott, Will & Emery

(57) ABSTRACT

A down-shift is carried out when a) the sum of a dry force of a vehicle and a predetermined value, is smaller than a running resistance, and b) when an accelerator opening is larger than a threshold value which is based on vehicle speed, road inclination, and speed change step (gear position).

6 Claims, 5 Drawing Sheets

APPARATUS AND METHOD FOR CONTROLLING A SPEED CHANGE OF AN AUTOMATIC TRANSMISSION

BACKGROUND OF THE INVENTION

(1) Field of the Invention

The present invention relates to an apparatus and a method for controlling a speed change of an automatic transmission of an automobile, and more particularly, to a technique of carrying out a down-shift on the basis of a vehicle running resistance and a drive force.

(2) Related Art of the Invention

Conventionally, in order to speedily carry out a down-shift with respect to an increase of a running resistance such as an incline resistance, there has been proposed a speed change control apparatus for an automatic transmission (see Japanese Unexamined Patent Publication No. 7-239021), which is constructed in a manner of making a comparison between the running resistance and a drive force, and forcibly carrying out a down-shift when the drive force is less than the running resistance.

As described above, with the construction of carrying out a forced down-shift on the basis of the comparison between the running resistance and the drive force, for example, when an uphill incline changes from +4% to +8%, an increase in the uphill incline is made a trigger, a forced down-shift is carried out.

The insufficient drive force is speedily compensated according to the aforesaid forced down-shift; however, the forced down-shift is carried out regardless of a driving operation of a driver. Therefore, there has arisen a problem that the driver feels the aforesaid down-shift like a sudden speed change.

SUMMARY OF THE INVENTION

The present invention has been made taking the aforesaid problem in the prior art into consideration. It is, therefore, an object of the present invention to secure a drive force with respect to a change in a running resistance, and to carry out a down-shift for securing the drive force so as to meet a driver's intention.

To achieve the above object, with the present invention which provides an apparatus and a method for controlling a speed change of an automatic transmission, a driver's down-shift intention is detected, and a down-shift requirement is carried out on the basis of a vehicle running resistance and a drive force only when the driver intends to carry out the down-shift.

With the construction of the present invention, even in the case where a down-shift requirement is output on the basis of the vehicle running resistance and the drive force, when the driver does not intend to carry out the down-shift, the down-shift is not carried out, and only when the driver intends to carry out the down-shift, the down-shift is carried out. Therefore, it is possible to prevent the driver from feeling the down-shift on the basis of the running resistance and the drive force like a sudden speed change.

In this case, when a summed value of the maximum drive force at a current speed change step and a threshold value is smaller than a running resistance, a down-shift requirement may be output.

With the above construction of the present invention, when a drive force for securing a margin of traction is secured with respect to the running resistance, the down-shift requirement is not output; on the other hand, when the margin of traction is not secured, the down-shift requirement is output.

Further, when an engine load is equal to or more than a threshold value, a judgment may be made such that the driver has a down-shift intention.

With the above construction of the present invention, when the engine load is equal to or more than the threshold value, it is estimated that the driver feels an insufficient drive force and has made an operation for increasing the engine load; therefore, it is judged that there is a down-shift intention.

The threshold value of the engine load may be changed in accordance with vehicle operating conditions.

With the above construction of the present invention, even in the same engine load, the down-shift intention is detected or not detected depending upon vehicle operating conditions. Thus, it is possible to accurately judge the down-shift intention regardless of a change in vehicle operating conditions.

The vehicle operating conditions include at least one of a vehicle speed or a speed change step.

With the above construction of the present invention, an engine load level for detecting the down-shift intention changes depending upon vehicle running speed and/or speed change step. In a general automatic speed change control, the down-shift is carried out in a higher engine load state on high vehicle speed side. Therefore, in order to judge the driver's down-shift intention in an engine load state greater than on a low vehicle speed side, a threshold value of the engine load is preferably set to a greater value on the high vehicle speed side. Further, when a speed change step is situated on the low speed side, the down-shift is carried out in a higher engine load state; therefore, the threshold value of the engine load is preferably set to a greater value on the low speed step side.

The threshold value of the engine load may be changed in accordance with vehicle running environment.

With the above construction of the present invention, even in the same engine load, the down-shift intention is detected or not detected depending upon vehicle running environment. Thus, it is possible to accurately judge the down-shift intention regardless of a change in vehicle running environment.

The vehicle running environment may include an incline of a running road surface.

With the above construction of the present invention, an engine load level for detecting the down-shift intention changes depending upon an incline of a road surface where the vehicle is running. In general, when the uphill incline is steep, a driver, who intends to carry out the down-shift, greatly steps on an accelerator pedal. Thus, the threshold value of the engine load is preferably set to a greater value when the uphill incline is steep.

The engine load may be detected on the basis of an accelerator opening operated by the driver.

With the above construction of the present invention, the engine load is representative of an accelerator opening, and when the accelerator opening is equal to or more than the threshold value, the driver's down-shift intention is detected. In place of directly detecting the accelerator opening, it is possible to detect an opening of a throttle vale opening and closing in synchronous with the accelerator pedal.

In order to detect the driver's down-shift intention, when the actual accelerator opening is equal to or more than a threshold value set in accordance with a vehicle running speed, an incline resistance of a running road surface and a speed change step, the driver's down-shift intention may be detected.

With the above construction of the present invention, the driver's down-shift intention is detected according to the result whether or not the accelerator opening corresponding substantially to the engine load is equal to or more than a threshold value set in accordance with a vehicle running speed, an incline resistance of a running road surface and a speed change step.

The other objects and features of the present invention will be apparent from an embodiment set forth below, with reference to the accompanying drawings.

PREFERRED EMBODIMENTS

An embodiment of the present invention will be described below.

Figure 1:
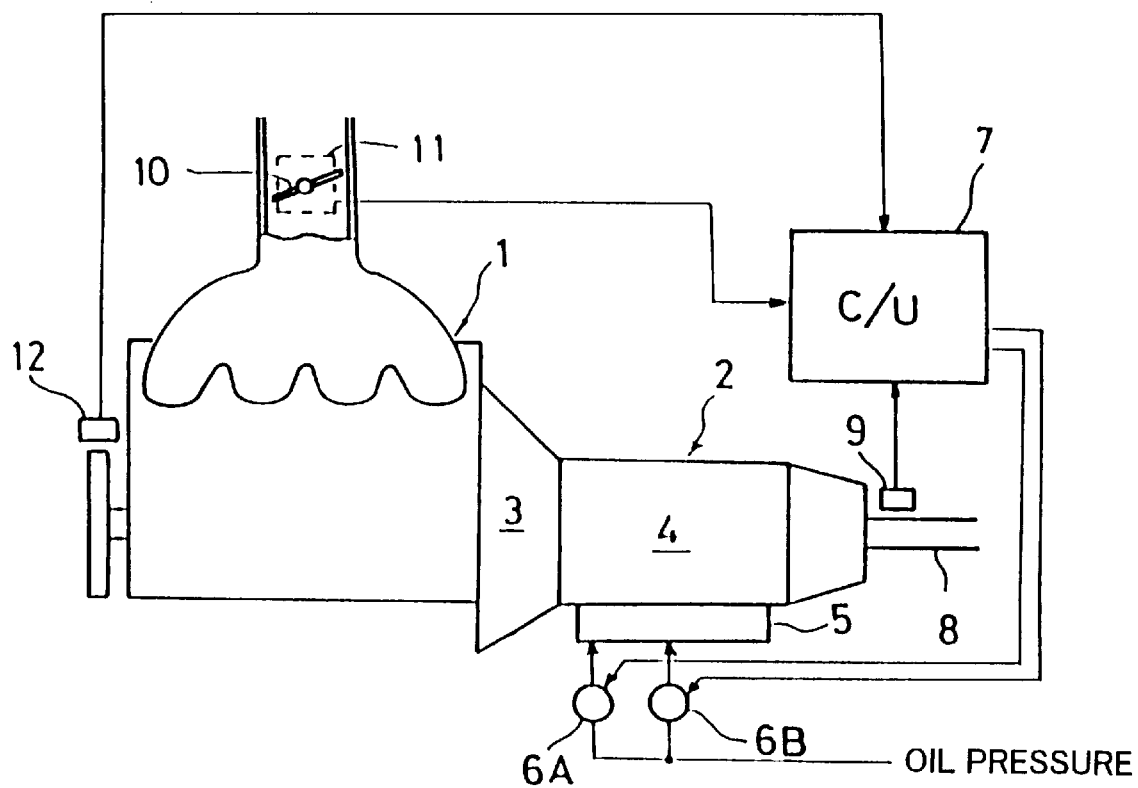
FIG. 1 is a diagram illustrating a system configuration of an embodiment of the present invention.

FIG. 1 is a diagram illustrating a system configuration of an engine according to an embodiment of the present invention.

In FIG. 1, an engine 1 has an automatic transmission 2 provided on an output side thereof. The automatic transmission 2 comprises a torque converter 3 provided on the output side of the engine 1, a gear type speed changer 4 which is connected to the engine output side by way of the torque converter 3, and a hydraulic actuator 5 which engages and disengages various speed change elements in the gear type speed changer 4.

An on/off control of the operating pressure for the hydraulic actuator 5 is made by means of various solenoid valves. In the present case, however, only shift solenoid valves 6A and 6B are shown.

Signals from various sensors are input to a control unit 7.

For the various sensors, there is provided a vehicle speed sensor 9 which detects a vehicle speed VSP on the basis of a rotation signal obtained from an output shaft 8 of the automatic transmission 2.

Further, a potentiometer type throttle sensor 11 is provided for sensing a throttle valve opening TVO of a throttle vale 10 in an air intake system of the engine 1. Also, the throttle valve opening-TVO corresponds to an accelerator opening, and is used as a parameter representative of the engine load.

Furthermore, a crank angle sensor 12 is provided on a crank shaft of the engine 1 or a shaft rotating synchronously with the crank shaft. A signal from the crank angle sensor 12 is a pulse signal for each reference crank angle. And then, an engine rotational speed Ne (rpm) is computed from a period of the pulse signal.

The control unit has a built-in microcomputer, and carries out a speed change control on the basis of signals from various sensors.

The microcomputer automatically sets a speed change step from speed 1 to speed 4 according to a speed change control routine described later, and controls a combinations of the on/off of shift solenoid valves 6A and 6B so that the gear type speed changer 4 is controlled to the speed change step by means of the hydraulic actuator 5.

Figure 2:
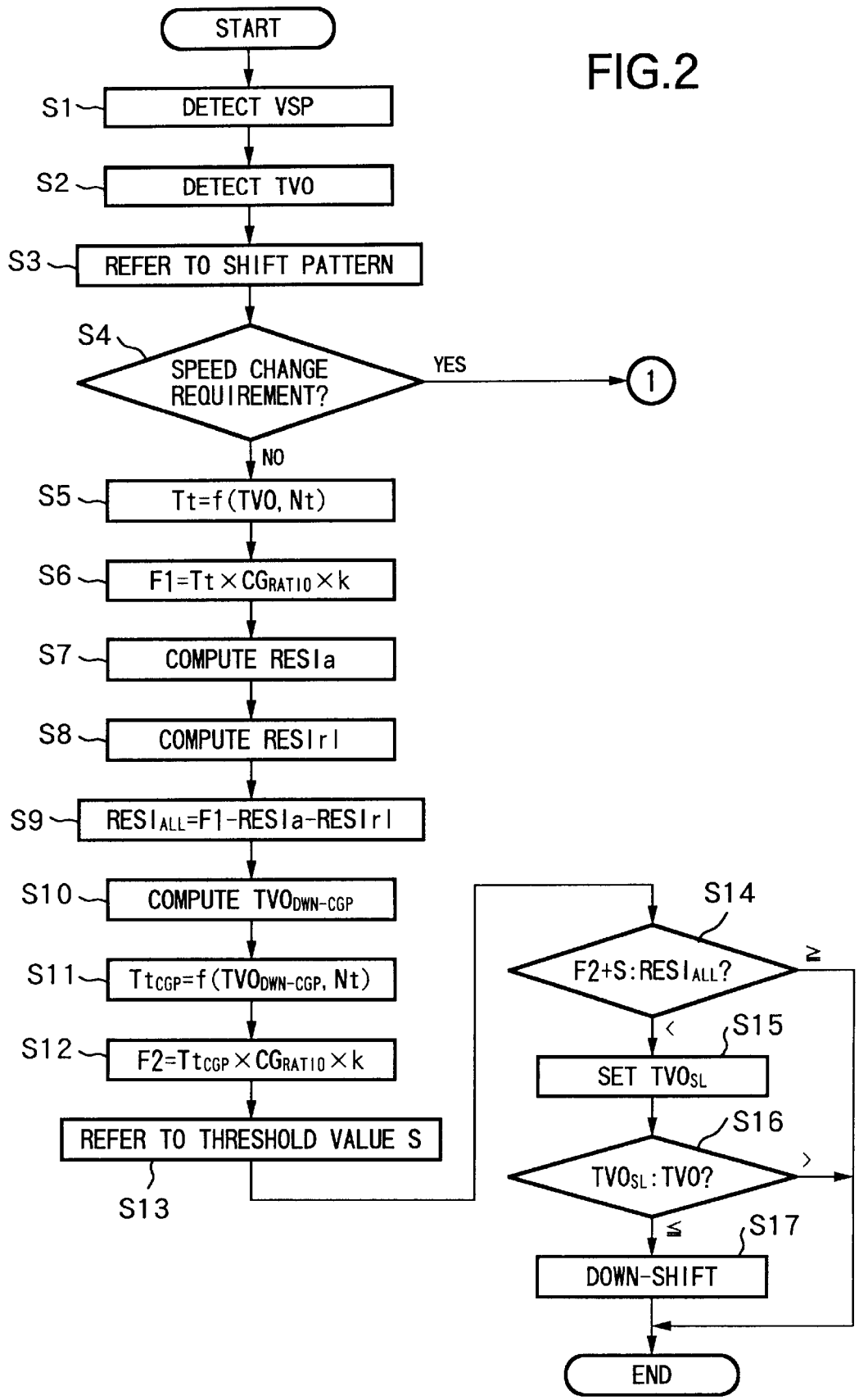
FIG. 2 is a flowchart for a previous part of a speed change control routine.
Figure 3:
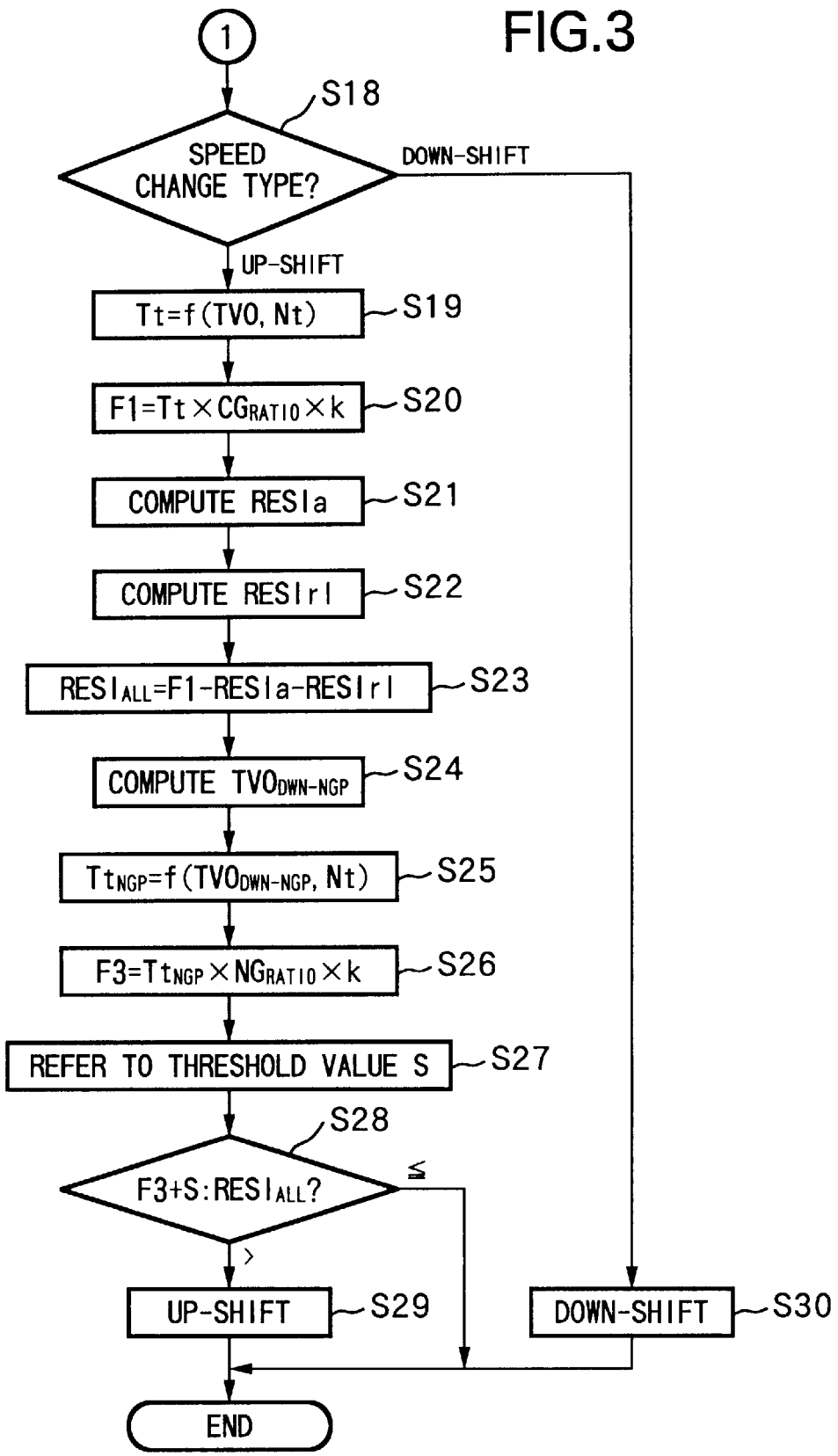
FIG. 3 is a flowchart for a subsequent part of a speed change control routine.

Next, the following is an explanation about the speed change control routine shown in flowcharts of FIG. 2 and FIG. 3. Also, this routine is carried out for each predetermined time.

In step S1, a vehicle speed VSP is detected on the basis of the signal from the vehicle speed sensor 9.

In step S2, a throttle valve opening TVO indicating an engine load is detected on the basis of the signal from throttle sensor 11.

Figure 4:
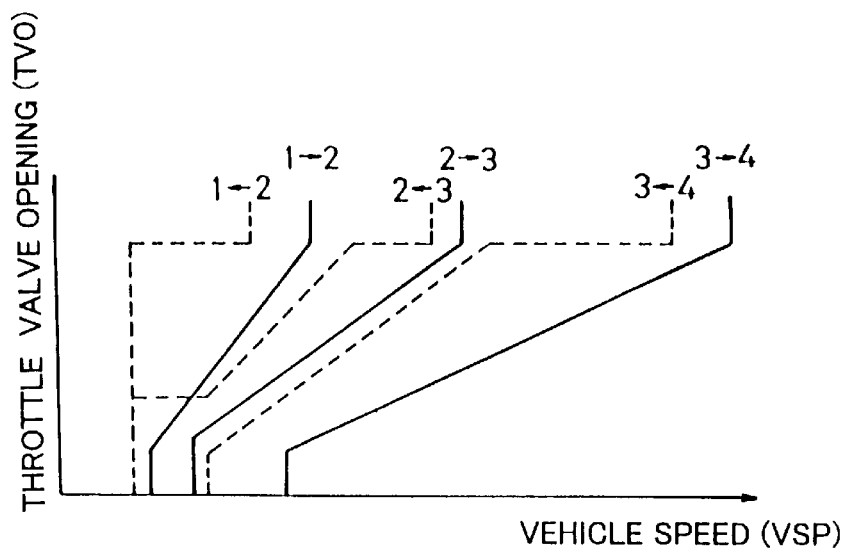
FIG. 4 is a map showing shift pattern lines.

In step S3, a reference is made to the shift pattern map as shown in FIG. 4, in which a speed change step is previously determined in accordance with the vehicle speed VSP and the throttle valve opening TVO, to select the speed change step corresponding to the current vehicle speed VSP and throttle valve opening TVO.

In the shift pattern map of FIG. 4, a solid line denotes an up-shift line, and a broken line denotes a down-shift line.

In step S4, the selected speed change step and the current speed change step are compared, and then, it is judged whether or not there is a speed change requirement (an up-shift or down-shift requirement).

As a result, in the case of no speed change requirement, the control procedure proceeds to step S5, while in the case of a speed change requirement, the control procedure proceeds to step S18.

Figure 5:
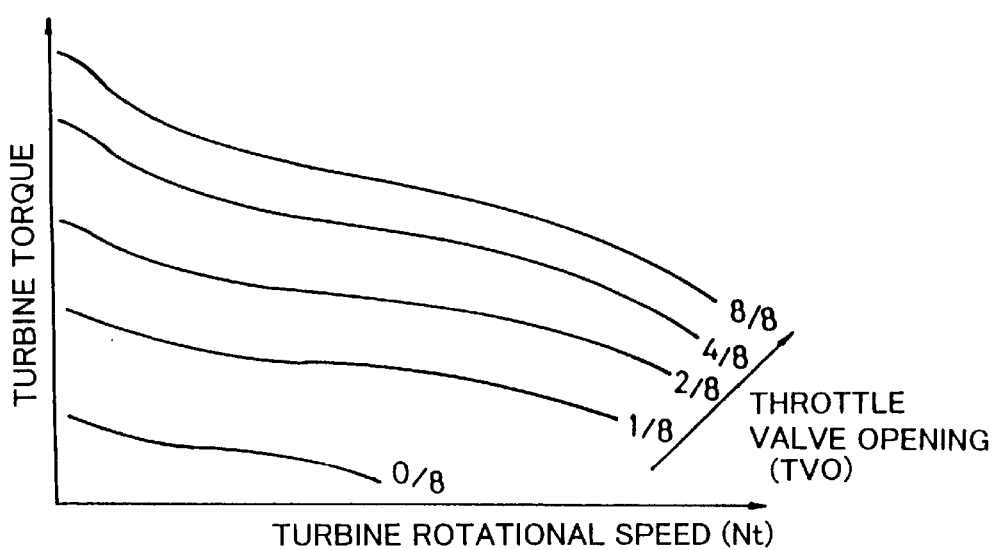
FIG. 5 shows a map for computing a turbine torque.

In step S5, a reference is made to the map shown in FIG. 5, and then, a turbine torque Tt is computed on the basis of the current throttle valve opening TVO and a turbine rotational speed Nt. In this case, the turbine rotational speed Nt is computed from the vehicle speed VSP and a gear ratio $CG_{RATIO}$ of the current speed change step.

In step S6, based on the computed turbine torque Tt, a current drive force F1 is computed according to the following equation.

$$F1 = Tt \times CG_{RATIO} \times k$$

Where, $CG_{RATIO}$ is a gear ratio of the current speed change step, and k is a constant determined by a tire radius or the like.

In step S7, an acceleration resistance RESIa is computed according to the following equation.

$$RESIa = \Delta VSP \times W \times K$$

Where, $\Delta VSP$ is a change in a vehicle speed, W is a vehicle weight, and K is a constant.

Figure 6:
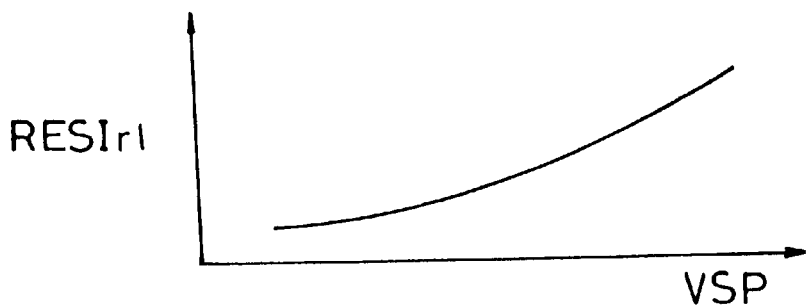
FIG. 6 shows a map for computing a rolling resistance+air resistance.

In step S8, a reference is made to the map shown in FIG. 6, and then, a rolling resistance+air resistance RESIrI is computed from the vehicle speed VSP.

In step S9, according to the following equation, by subtracting the acceleration resistance RESIa and the rolling resistance+air resistance RESIrI from the current drive force F1, a running resistance $RESI_{ALL}$ is computed.

$$RESI_{ALL} = F1 - RESIa - RESIrI$$

In step S10, referring to the aforesaid shift pattern map, a throttle valve opening TVO corresponding to the current vehicle speed VSP on the down-shift line from the current speed change step to a speed change step on a low speed side, is obtained, and this throttle valve opening is determined as $TVO_{DWN-CGP}$ (the down-shift throttle valve opening at the current speed change step).

Figure 7:
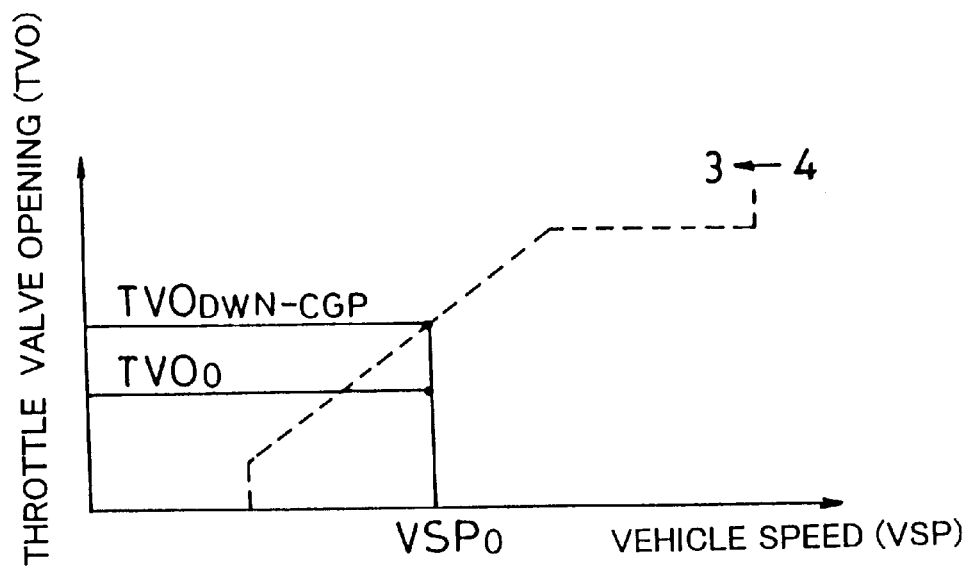
FIG. 7 is a diagram for illustrating a method for computing a throttle valve opening where the down-shift is carried out.

More specifically, referring now to FIG. 7, when the current speed change step is the speed 4 and the current vehicle speed $VSP=VSP_0$, a throttle valve opening $TVO_{DWN-CGP}$ corresponding to the current vehicle speed $VSP_0$ on the down-shift line from speed 4 to speed 3 is obtained. In FIG. 7, the throttle valve opening $TVO_0$ is the current throttle valve opening.

In step S11, referring now to the map of FIG. 5, a turbine torque $Tt_{CGP}$ is computed on the basis of the current down-shift throttle valve opening $TVO_{DWN-CGP}$ at the current speed change step and the current turbine rotational speed Nt. This turbine torque $Tt_{CGP}$ is the maximum turbine torque at the current speed change step.

In step S12, the maximum drive force F2 at the current speed change step is computed on the basis of the computed turbine torque $Tt_{CGP}$ according to the following equation.

$$F2 = Tt_{CGP} \times CG_{RATIO} \times k$$

Where, $CG_{RATIO}$ is a gear ratio at the current speed change step (speed 4), and k is a constant determined by a tire radius or the like.

In step S13, a threshold value S of the drive force is computed on the basis of the vehicle speed VSP or the current speed change step. The higher the vehicle speed is, the smaller the aforesaid threshold value S is preferably set. Further, the threshold value is preferably set smaller at high speed change step.

In step S14, a comparison is made between the sum (F2+S) of the maximum drive force F2 at the current speed change step (speed 4) and the threshold value S, and the running resistance $RESI_{ALL}$.

If the comparative result is $F2+S \geq RESI_{ALL}$, the present routine ends.

On the contrary, if the comparative result is $F2+S < RESI_{ALL}$, a judgment is made that the down-shift is required due to insufficient drive force, and the down-shift requirement is output. And then, the control procedure proceeds to step S15 (down-shift requirement outputting device).

In step S15, in accordance with the vehicle speed VSP, the incline resistance (running resistance $RESI_{ALL}$) and the speed change step, a reference is previously made to a map which stores a threshold value $TVO_{SL}$ for judging the driver's down-shift intention based on the throttle valve opening TVO (accelerator opening). And then, the threshold value $TVO_{SL}$ corresponding to the current vehicle speed VSP, incline resistance (running resistance $RESI_{ALL}$) and speed change step, is set. The aforesaid map for the threshold value $TVO_{SL}$ may be prepared in a manner that a map which stores the threshold value $TVO_{SL}$ corresponding to the vehicle speed VSP, incline resistance (running resistance $RESI_{ALL}$) is provided for each speed change step.

In an ordinary shift pattern, since the down-shift is carried out in a higher engine load state on high vehicle speed side, the threshold value $TVO_{SL}$ is preferably set greater on high vehicle speed side so that the driver's down-shift intention is judged in an engine load state greater than low vehicle speed side. Further, since when the speed change step is situated on the low speed side, the down-shift is carried out in a higher engine load state, the threshold value $TVO_{SL}$ is preferably set to a greater value on low speed change step side. Furthermore, in general, when the uphill incline is steep, the driver who intends to carry out the down-shift, greatly steps on an accelerator pedal. Thus, the threshold value $TVO_{SL}$ is preferably set to a greater value when the uphill incline is steep.

In step S16, a comparison is made between the threshold value $TVO_{SL}$ and the current throttle valve opening TVO. If the current throttle valve opening TVO is equal to or more than the threshold value $TVO_{SL}$ (in other words, when the engine load is equal to or more than the threshold value), the driver's down-shift intention is detected (down-shift intention detecting device), and the control procedure proceeds to step S17. And then, a down-shift requirement signal is output, and a forced down-shift is carried out (down-shift control device).

As described above, when the maximum drive force F2 at the current speed change step+the threshold value S is less than the running resistance $RESI_{ALL}$ and the driver's down-shift intention is detected on the basis of the throttle valve opening TVO, in order to compensate an insufficient drive force, the down-shift is carried out before being carried out according to the ordinary shift pattern.

In this case, even if the maximum drive force F2 at the current speed change step+the threshold value S is less than the running resistance $RESI_{ALL}$, in the case where the driver's down-shift intention is not detected on the basis of the throttle valve opening TVO, the forced down-shift is not carried out. Therefore, it is possible to prevent the driver from feeling like a sudden speed change due to such a situation that the forced down-shift is carried out regardless of the driver's down-shift intention.

On the other hand, in step S18, a judgment is made whether a speed change requirement is an up-shift requirement or a down-shift requirement.

If the speed change requirement is the down-shift requirement, the control procedure proceeds to step S30, and a down-shift requirement signal is output to carry out the down-shift.

If the speed change requirement is the up-shift (for example, from speed 3 to speed 4), the control procedure proceeds to step S19 in order to judge whether or not the up-shift is suitable.

In step S19, referring to the map shown in FIG. 5, the turbine torque Tt is computed on the basis of the current throttle valve opening TVO and the turbine rotational speed Nt. The turbine rotational speed Nt is computed from the vehicle speed (rotational speed (rpm) of output shaft) VSP and the gear ratio $CG_{RATIO}$ at the current speed change step.

In step S20, based on the computed turbine torque Tt, the current drive force F1 is computed according to the following equation.

$$F1 = Tt \times CG_{RATIO} \times k$$

Where, $CG_{RATIO}$ is a gear ratio of the current speed change step, and k is a constant determined by a tire radius or the like.

In step S21, the acceleration resistance RESIa is computed according to the following equation.

$$RESIa = \Delta VSP \times W \times K$$

Where, $\Delta VSP$ is a change in a vehicle speed, W is a vehicle weight, and K is a constant.

In step S22, a reference is made to the map shown in FIG. 6, and then, a rolling resistance+air resistance RESIrl is computed from the vehicle speed VSP.

In step S23, according to the following equation, by subtracting the acceleration resistance RESIa and the rolling resistance+air resistance RESIrI from the current drive force F1, a running resistance $RESI_{ALL}$ is computed.

$$RESI_{ALL}=F1-RESIa-RESIrI$$

In step S24, referring to the aforesaid shift pattern map, a throttle valve opening TVO corresponding to the current vehicle speed VSP on the down-shift line from the current speed change step from a next speed change, is obtained, and this throttle valve opening is determined as $TVO_{DWN-NGP}$ (the down-shift throttle valve opening at the next speed change step)(like FIG. 7).

In step S25, referring to the map shown in FIG. 5, a turbine torque $Tt_{NGP}$ is computed on the basis of the throttle valve opening $TVO_{DWN-NGP}$ at the next speed change step and the turbine rotational speed Nt. The turbine torque $Tt_{NGP}$ is the maximum turbine torque at the next speed change step (speed 4).

In step S26, based on the computed turbine torque $Tt_{NGP}$, a drive force F3 (the maximum drive force after speed change) at the next speed change step is computed according to the following equation.

$$F3=Tt_{NGP} \times NG_{RATIO} \times k$$

Where, $NG_{RATIO}$ is a gear ratio of the next speed change step, and k is a constant determined by a tire radius or the like.

In step S27, a threshold value S of the drive force is computed from the vehicle speed VSP or the next speed change step.

In step S28, a comparison is made between the sum (F3+S) of the maximum drive force F3 at the next speed change step and the threshold value S, and the running resistance $RESI_{ALL}$.

If the comparative result is $F3+S>RESI_{ALL}$, the control procedure proceeds to step S29, and then, an up-shift requirement signal is output to carry out the up-shift.

On the contrary, if the comparative result is $F3+S \leq RESI_{ALL}$, even if the up-shift is carried out, the up-shift is not carried out because insufficient drive force is anticipated, and this routine ends.

What is claimed is:

1. A speed change control apparatus for an automatic transmission comprising:

running resistance calculation means for calculating a vehicle running resistance;

drive force calculation means for calculating a drive force;

down-shift requirement outputting means for outputting a down-shift requirement when said running resistance is greater than the sum of said drive force and a threshold value;

accelerator opening detecting means for detecting an accelerator opening;

judgement level setting means for setting a judgement level of said accelerator opening higher as the accelerator opening increases;

down-shift requirement cancellation means for canceling said down-shift requirement output from said down-shift requirement output means, when said accelerator opening detected by said accelerator opening detecting means is smaller than said judgement level; and down-shift control means for carrying out a down-shift based on said down-shift requirement.

2. A speed change control apparatus for automatic transmission according to claim 1, wherein said judgement level setting means further sets said judgement level using a speed change step as a vehicle operating condition.

3. A speed change control apparatus for automatic transmission comprising:

running resistance calculation means for calculating a vehicle running resistance;

drive force calculation means for calculating a drive force;

down-shift requirement outputting means for outputting a down-shift requirement when said running resistance is greater than the sum of said drive force and a threshold value;

accelerator opening detecting means for detecting an accelerator opening;

judgement level setting means for setting a judgement level of said accelerator opening higher as an uphill incline of a running road surface of the vehicle increases;

down-shift requirement cancellation means for canceling said down-shift requirement output from said down-shift requirement output means, when said accelerator opening detected by said accelerator opening detecting means is smaller than said judgement level; and down-shift control means for carrying out a down-shift based on said down-shift requirement.

4. A speed change control method for an automatic transmission comprising the following steps of:

calculating a vehicle running resistance;

calculating a drive force;

outputting a down-shift requirement when said running resistance is greater than the sum of said drive force and a threshold value;

detecting an accelerator opening;

detecting a vehicle speed setting a judgement level of said accelerator opening higher as the vehicle speed increases;

canceling said down-shift requirement, when said accelerator opening is smaller than said judgement level.

5. A speed change control method for an automatic transmission according to claim 4, wherein said step of setting a judgement level further comprises the step of setting said judgement level using a speed change step as a vehicle operating condition.

6. A speed change control method for an automatic transmission comprising the following steps of:

calculating a vehicle running resistance;

calculating a drive force;

outputting a down-shift requirement when said running resistance is greater than the sum of said drive force and a threshold value;

detecting an accelerator opening;

setting a judgement level higher as an uphill incline of a running road surface of the vehicle is steeper; and canceling said down-shift requirement, when said accelerator opening is smaller than said judgement level.

* * * * *